(12) United States Patent
Madhusoodhanan et al.

(10) Patent No.: US 7,977,402 B2
(45) Date of Patent: Jul. 12, 2011

(54) RADIATION CURABLE INKS

(75) Inventors: Sudhakar Madhusoodhanan, Cincinnati, OH (US); Devdatt S. Nagvekar, Hamilton, OH (US)

(73) Assignee: Collins Ink Corporation, Cincinnati, OH (US)

( * ) Notice: Subject to any disclaimer, the term of this patent is extended or adjusted under 35 U.S.C. 154(b) by 806 days.

(21) Appl. No.: 11/973,743

(22) Filed: Oct. 10, 2007

(65) Prior Publication Data

US 2008/0090930 A1 Apr. 17, 2008

Related U.S. Application Data

(60) Provisional application No. 60/851,036, filed on Oct. 11, 2006.

(51) Int. Cl.
*C08F 2/50* (2006.01)
*C08J 3/28* (2006.01)
*C09D 11/10* (2006.01)
*C09D 11/00* (2006.01)

(52) U.S. Cl. ............. 522/183; 522/74; 522/71; 522/77; 522/168; 522/178; 522/182; 522/81; 522/121; 522/113; 106/31.13; 106/31.6; 523/160; 523/300

(58) Field of Classification Search ............. 522/74, 522/71, 77, 168, 178, 182, 183, 181, 121, 522/113; 106/31.13, 31.6; 523/160, 300
See application file for complete search history.

(56) References Cited

U.S. PATENT DOCUMENTS

| | | | |
|---|---|---|---|
| 5,587,405 A | 12/1996 | Tanaka et al. | |
| 6,123,921 A | 9/2000 | Meade et al. | |
| 6,300,388 B1 | 10/2001 | Verdonck et al. | |
| 6,310,115 B1 | 10/2001 | Vanmaele et al. | |
| 6,593,390 B1 | 7/2003 | Johnson et al. | |
| 6,730,714 B2 | 5/2004 | Ylitalo et al. | |
| 6,806,314 B2 * | 10/2004 | Fenn et al. | 525/123 |
| 7,462,653 B2 * | 12/2008 | Kakinuma et al. | 522/100 |
| 2002/0128340 A1 | 9/2002 | Young et al. | |
| 2004/0145088 A1 | 7/2004 | Patel et al. | |
| 2004/0201659 A1 | 10/2004 | Watanabe | |
| 2004/0207123 A1 | 10/2004 | Patel et al. | |
| 2005/0148681 A1 | 7/2005 | Schoen | |

FOREIGN PATENT DOCUMENTS

| | | |
|---|---|---|
| EP | 0540203 B1 | 5/1993 |
| JP | 2002060470 A * | 2/2002 |
| WO | WO 2005/047405 A1 | 5/2005 |
| WO | WO 2005/091811 A2 | 10/2005 |
| WO | WO 2006118532 A1 * | 11/2006 |

OTHER PUBLICATIONS

Alexander Grant, Reative Silanes in Cationic UV Jet-inks, NIP23 and Digital Fabrication (2007), pp. 129-133.
Keipert, Steven. J, Photocatalyst Systems, Coatings & Composite Materials (1996), No. 17, pp. 26-28.
El-Ghayoury, Abdelkrim, Ultraviolet-Ultraviolet Dual-Cure Process Based on Acrylate Oxetane Monomers, Journal of Polymer Science: Polymer Chemistry Edition (2003), vol. 41, pp. 469-475.

* cited by examiner

*Primary Examiner* — Sanza L McClendon
(74) *Attorney, Agent, or Firm* — Charles R. Wilson

(57) ABSTRACT

Radiation curable ink compositions for impulse printheads are described. The compositions include a photoinitiator system, containing both a photocation polymerization initiator and a free-radical photoinitiator, an acrylate ester of a carboxylic acid ester, and at least one radiation curable material.

20 Claims, No Drawings

RADIATION CURABLE INKS

RELATED APPLICATION DATA

This application claims the benefit of U.S. Provisional Application Ser. No. 60/851,036 filed Oct. 11, 2006, the entire contents of which are hereby incorporated by reference.

FIELD OF THE INVENTION

The present invention relates to a hybrid radiation curable ink which can be advantageously utilized in impulse printheads. The composition combines the advantages of radical and cationic cure, and includes a photoinitiator system, which comprises both a photocation polymerization initiator and a free-radical photoinitiator; an acrylate ester of a carboxylic acid ester; and a radiation curable material, which may include one or more of a mono-functional component, a poly-functional component or a di-functional component. In one embodiment, the composition is characterized by the absence of di-functional component. In another embodiment, the composition is characterized by the absence of poly-functional component. In another embodiment, the composition characterized by the absence of an oxetane.

BACKGROUND OF THE INVENTION

Adhesion to multiple substrates has been addressed in the past by using a custom formulation for each substrate. However, adhesion of UV curable inkjet inks to substrates such as glass, PET and metals is still challenging. Hybrid inks based on high viscosity epoxy-acrylates and with oxetanes have been studied in UV curable inks. (See "Photocatalyst Systems" Keipert, S. J. Coatings & Composite Materials (1996) 4, No. 17, pp. 26-8, and "Ultraviolet dual cure process based on acrylate oxetane monomers" Journal of Polymer Science: Polymer Chemistry Edition (2003), 41, No. 4, pp. 469-75.). However, due to the high viscosities of these inks, they are unsuitable for inkjet inks. Inkjet inks cured by cationic mechanism have been investigated. (See "Jettable Ink", WO 2005/091811A2.) As they cure by cationic mechanism, these compositions do not incorporate an acrylate. A hybrid inkjet ink system was developed for 3D cure, (See "3D Model Maker" US2004/0207123 A1. [5] "Three dimensional structured printing" US 2004/0145088 A1.) however, this is a two component system with the UV curable monomers applied as a first layer followed by a second layer consisting of photoinitiators. (See "Three dimensional printing" WO 02/064353 A1.)

SUMMARY OF THE INVENTION

In one embodiment, there is provided a radiation curable ink composition for impulse printheads which includes a photoinitiator system, containing both a photocation polymerization initiator and a free-radical photoinitiator, an acrylate ester of a carboxylic acid ester, and at least one radiation curable material containing a radiation curable functional group, wherein the ink composition has a viscosity of less than about 70 cPs at 25° C.

In another embodiment, there is provided a radiation curable ink composition for impulse printheads which includes a photoinitiator system, containing both a photocation polymerization initiator and a free-radical photoinitiator, an acrylate ester monomer having hydroxyl functionality, and at least one radiation curable material containing a radiation curable functional group, wherein the ink composition has a viscosity of less than about 70 cPs at 25° C.

In another embodiment, there is provided a process for preparing a printed article, which includes contacting a substrate with a radiation curable ink composition containing a photoinitiator system, which includes both a photocation polymerization initiator and a free-radical photoinitiator, an acrylate ester of a carboxylic acid ester, and at least one radiation curable material containing a radiation curable functional group.

In another embodiment, there is provided an article of manufacture, which includes a substrate and a cured radiation curable ink composition, where the ink composition contains a photoinitiator system which contains both a photocation polymerization initiator and a free-radical photoinitiator, an acrylate ester of a carboxylic acid ester, and at least one radiation curable material containing a radiation curable functional group.

DETAILED DESCRIPTION

Disclosed are radiation curable inks that meet the desired properties of stability at high shear rate (good rheological stability), stability at high temperatures, and/or stability in print heads, especially impulse print heads. The inks of the invention exhibit a wide process window at or above 4 kHz print speeds using an impulse print head. A print speed at this level allows for the radiation curable ink to be printed at speeds similar to traditional inkjet inks. The radiation curable inks disclosed herein are curable with radiation, including ultra-violet (UV) radiation. In a particularly advantageous feature, radiation curable inkjet inks can be formulated that have good jet performance, including good jet break up and a broad operating window under rapid printing conditions, without loss of printing resolution and print quality. The ink also desirably has good physical and chemical stability at both ambient temperatures and print head operating temperatures, as well as good aging stability.

The radiation curable inks of the invention may be used in a drop-on-demand printhead, and especially in a piezoelectric drop-on-demand printhead, and are based upon a photopolymerizable composition combining the advantages of radical and cationic cure. The resulting polymeric film has dark cure, which considerably increases the conversion of the polymer, and results in excellent adhesion to multiple substrates such as glass, polyethylene terephthalate (PET), polycarbonate (PC), vinyl and ceramic. The slow dark cure also leads to less shrinkage and imparts good flexibility. The disadvantages of the cationic photopolymerization of epoxy, affected by moisture and slow photocuring speed, are overcome by incorporating radical photopolymerization of acrylates in the hybrid photopolymerization system.

Impulse printheads, also known as "drop on demand," as used herein refers to four types of printheads: airbrush, electrostatic, piezoelectric, and thermal. Piezoelectric printheads are available in two classes: binary (on or off) and greyscale (building up a drop's size by adding multiple amounts of smaller drops to it). Impulse printheads are to be distinguished from continuous inkjet printing printheads.

The radiation curable inks comprise a radiation curable composition. Such compositions contain, as the predominant component(s), at least one radiation curable material containing a radiation curable functional group, for example an ethylenically unsaturated group, an epoxide, or an oxetane and the like. Suitable ethylenically unsaturated groups include acrylate, methacrylate, acrylamide, methacrylamide, vinyl, allyl, or other ethylenically unsaturated functional groups. As used herein, "(meth)acrylate" is inclusive of both acrylate and methacrylate functional groups. The materials can be in the form of monomers, oligomers, and/or polymers, or mixtures thereof. As used herein, the term "monomer" is a compound whose molecules can join together to form oligomers or polymers. "Oligomers" as used herein is a polymer intermediate containing relatively few structural units (e.g. 2, 3, or 4 repeat units). Ethylenically unsaturated alkoxylated compounds are excluded from the definition of an oligomer and are herein considered monomers unless indicated otherwise. For example, propoxylated neopentyl glycol diacrylate is considered a di-functional monomer.

The materials can also be mono-functional, di-functional, or poly-functional, for example tri-, tetra-, or higher functional materials. As used herein, mono-, di-, tri-, and tetra-functional materials refers to compounds having one, two, three, and four radiation curable functional groups per molecule. "Poly-functional component" refers to a monomer or oligomer component containing more than two functional groups per molecule. With certain oligomeric material, the label of mono-, di-, or poly-functional can be based on an average functionality rather than an absolute. Suitable radiation curable materials are generally liquids of low volatility, both at ambient temperature and at temperatures employed in the print heads.

The hybrid radiation curable ink of the invention, which can be advantageously utilized in impulse printheads, includes a photoinitiator system, which comprises both a photocation polymerization initiator and a free-radical photoinitiator; an acrylate ester of a carboxylic acid ester; and a radiation curable material, which may include one or more of a mono-functional component, a poly-functional component or a di-functional component. In one embodiment, the composition is characterized by the absence of di-functional component. In another embodiment, the composition is characterized by the absence of poly-functional component. In another embodiment, the composition characterized by the absence of an oxetane. In another embodiment, the composition further includes a silane adhesion promoter.

Photoinitiator System (Component 1)

The ink formulations of the invention includes a photoinitiator system which comprises both a photocation polymerization initiator and a free-radical photoinitiator.

The photocation polymerization initiator may contain an onium salt. Onium salt includes, for example, UVI-6950, UVI-6970, UVI-6974, UVI6976, UVI-6990 and UVI 6992 (available from the Dow Chemical Company, Midland, Mich.), ADEKA Optomers SP-150, SP-151, SP-170, and SP-171 (available from Asahi Denka Kogyo, Tokyo, Japan), Omnicat 550, Omnicat 650, Omnicat BL550, Omnicat 440, Omnicat 445, Omnicat 432, Omnicat 430, Omnicat 750 (available from IGM resins, Shanghai, China), Irgacure 261 and 250 (available from Ciba, New York, N.Y.), CI-2481, CI-2624, CI-2689, and CI-2064 (available from Nippon Soda, Tokyo, Japan), CD-1011, and CD-1012 (available from Sartomer, Exton, Pa.), and DTS-102, DTS-103, NAT-103, NDS-103, TPS-103, MDS-103, MPI-103, BBI-103 (available from Midori Kagaku, Tokyo, Japan), Chivacure 1176, Chivacure 1190, R-gen BF 1172, R-gen 1130, R-gen 261 (available from Chitec Technology Co. Ltd.,) Uvacure 1600 (available from Cytec Surface Specialties, West Paterson, N.J.), including combinations and sub-sets thereof.

The free-radical photoinitiator is selected based on the type of colorant present and the radiation wavelength used to cure the ink. A blend of photoinitiators can be used, having peak energy absorption levels at varying wavelengths within the range of the selected radiation for cure. Preferably, the photoinitiator and photoinitiator blends are sensitive to the wavelengths not absorbed, or only partially affected, by the pigments.

Examples of suitable photoinitiators include 2-benzyl-2-(dimethylamino)-4'-morpholinobutyrophenone; 2-hydroxy-2-methylpropiophenone; trimethylbenzophenone; methylbenzophenone; 1-hydroxycyclohexylphenyl ketone; isopropyl thioxanthone; 2,2-dimethyl-2-hydroxy-acetophenone; 2,2-dimethoxy-2-phenylacetophenone; 2-methyl-1-[4-(methylthio)phenyl]-2-morpholino-propan-1-one; 2,4,6-trimethylbenzyl-diphenyl-phosphine oxide; 1-chloro-4-propoxythioxanthone; benzophenone; bis(2,6-dimethoxybenzoyl)-2,4,4-trimethyl pentyl phosphine oxide; 5,7-diiodo-3-butoxy-6-fluorone, ethyl 2,4,6-trimethylbenzoylphenylhosphinate; oxy-phenyl-acetic acid 2-[2-oxo-2-phenyl-acetoxy-ethoxy]-ethyl ester and oxy-phenyl acetic acid 2-[2-hydroxy-ethoxy]-ethyl ester; 1-phenyl-2-hydroxy-2-methyl propanone; bis(2,4,6-trimethylbenzoyl)phenylphosphine oxide; camphorquinone; polymeric photoinitiators such as polymeric benzophenone Genopol BP-1 (Rahn U.S.A.), Omnipol BP, Omnipol SZ, Omnipol BL 801T, Omnipol 801S, Omnipol BPLV (from IGM resins) and the like. Combinations and sub-sets, comprising one or more the foregoing may also be used. Suitable commercially available photoinitiators include, but are not limited to Irgacure 907, Irgacure 819, Irgacure 2959, Irgacure 184, Irgacure 369, Benzophenone, Darocur D1173, Irgacure 754, and Irgacure 651 (available from Ciba, New York, N.Y.), SarCure SR1137 (TZT) and SarCure SR1124 (ITX) (available from Sartomer, Exton, Pa.), Methyl benzoylformate (Genocure MBF) (available from Rahn U.S.A. Corp, Aurora, Ill.), H-Nu 470, H-Nu 535, H-Nu 635, H-Nu 640, and H-Nu 660 (available from Spectra Group Limited, Millbury, Ohio), and Lucirin TPO-L (available from BASF, Florham Park, N.J.). ESACURE SM246 (available from Lamberti U.S.A.).

Each of the photocation polymerization initiator and the free-radical photoinitiator are individually utilized in amounts effective to initiate polymerization in the presence of the curing radiation. The polymerization initiators may each separately be utilized in about 0.5 to about 15 wt. %, preferably about 1 to about 12 wt. %, more preferably about 2 to about 10 wt. %, and even more preferably about 3 to about 8 wt. %, based on the total weight of the ink.

The photoinitiator composition can further contain a photosensitizer, specifically 2-isopropyl-9H-thioxanthen-9-one, 2,4-diethylthioxanthone, 1-chloro-4-propoxy-9h-thioxanthene-9-one, 2-chlorothioxanthone, anthracene, 9,10-diethoxy anthracene and the like. Examples of commercially available photosensitizers are Darocur ITX (available from Ciba, New York, N.Y.), CPTX 1-chloro-4-propoxy-thioxanthone (available from Chemtura Corporation, Middlebury, Conn.), Genocure DETX (available from Rahn U.S.A. Corp, Aurora, Ill.), Speedcure CTX (available from Lambson limited, Wetherby, West Yorkshire) and the like. The photosensitizer can be present in the ink in an amount of about 0 to about 20 wt. %, specifically about 0.1 to about 10 wt. %, and more specifically about 0.2 to about 2 wt. %, based on the total weight of the ink.

Acrylate Ester of a Carboxylic Acid Ester (Component 2)

The ink formulations of the invention include an acrylate ester of a carboxylate acid ester, which are described herein as compounds of the general formula:

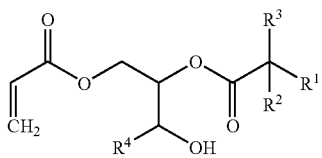

having a carboxylate ester moiety containing groups $R^1$, $R^2$ and $R^3$, which are each independently alkyl, aryl, alkylaryl, alkoxyaryl or cycloaliphatic groups, where the total number of carbon atoms included in groups $R^1$, $R^2$ and $R^3$ range from 1 to 10. Each of $R^1$, $R^2$ and $R^3$ group can independently be selected from phenyl, hydrogen, methyl, ethyl, propyl, butyl, pentyl, hexyl, heptyl, octyl, nonyl, decyl and combinations or any subset thereof. The $R^4$ group is selected from hydrogen, methyl, ethyl, propyl, butyl, pentyl, hexyl, heptyl, octyl, nonyl, decyl, phenyl and alkoxy phenyl. In a preferred embodiment $R^4$ is hydrogen. In an even more preferred embodiment $R^3$ is a methyl group and $R^4$ is hydrogen. Representative examples of acids from which the carboxylate ester moiety can be derived include α,α-dimethyl-caproic acid, α-ethyl-α-methyl-caproic acid, α,α-diethyl-caproic acid, α,α-diethyl-valeric acid, α,α-dimethyl-capric acid, α-butyl-α-ethyl-capric acid, α,α-dimethyl-enanthic acid, α,α-diethyl-pelargonic acid, α-butyl-α-methyl-caproic acid, α,α-dimethyl-caprylic acid, α-methyl-α-propyl-caproic acid, α-ethyl-α-methyl-enanthic acid, α-methyl-α-propyl-valeric acid, α-ethyl-α-methyl-caprylic acid, α-butyl-α-methyl-caprylic acid, α-ethyl-α-propyl-caproic acid, α-ethyl-α-propyl-valeric acid, α-butyl-α-ethyl-pelargonic acid, α,α-dimethyl propionic acid (pivalic acid), neodecanoic acid and combinations as well as any subset thereof. Preferred examples of acrylate esters of carboxylic acid esters include but are not limited to acrylate esters of glycidyl esters of neodecanoic acid or acrylate ester of glycidyl ester of pivalic acid and combinations thereof.

The amount of acrylate esters of carboxylate acid esters utilized in the ink composition of the invention is about 0.01 to about 50 weight percent (wt. %), preferably about 0.5 to about 30 wt. %, and more preferably, 1 to about 25 wt. %, based on the total weight of the ink.

Mono-Functional Component (Component 3)

The ink formulation of the present invention includes a mono-functional component which can be an acrylate ester monomer having hydroxyl functionality, a mono-functional oxetane, a mono-functional epoxy, a monofunctional vinyl ether or vinyl ether alcohol, a mono-functional ethylenically unsaturated compound, a mono-functional oligomer, or any combination or subset thereof. The amount of mono-functional component utilized in the ink composition of the invention is about 1 to about 70 weight percent (wt. %), preferably 3 to about 60 wt. %, preferably about 5 to about 50 wt. % based on the total weight of the ink.

Acrylate Ester Monomer Having Hydroxyl Functionality

The ink formulations of the present invention include an acrylate ester monomer having hydroxyl functionality. Suitable acrylate ester monomers include hydroxyl functional monoacrylates, or their mono(meth) acrylates of straight chain, branched chain, or cyclic alkyl alcohols, including polyether alcohols.

Hydroxyl-functional mono acrylates include but are not limited to hydroxyalkylacrylates and hydroxyalkyl(meth)acrylates wherein the hydroxyalkyl group contains 1 to 10 carbon atoms, preferably 1 to 6 carbon atoms. Suitable examples include hydroxyethylacrylate, hydroxyethyl(meth) acrylate, hydroxypropylacrylate, hydroxypropyl(meth)acrylate, hydroxybutylacrylate, hydroxybutyl(meth)acrylate, 2-hydroxy-3-phenyloxypropylacrylate 2-hydroxy-3-phenyloxypropyl(meth)acrylate, 1,4-butanediol monoacrylate, 1,4-butanediol mono(meth)acrylate, 4-hydroxycyclohexylacrylate, 4-hydroxycyclohexyl(meth)acrylate, 1,6-hexanediol monoacrylate, 1,6-hexanediol mono(meth)acrylate, caprolactone acrylate (Miramer M100 (available from Rahn U.S.A. Corp, Aurora, Ill.) or SR 495B (available from Sartomer, Exton, Pa.)) and any combination or subset thereof.

Mono-functional Oxetane Component

The formulations of the present invention include a mono-functional oxetane component. Suitable mono-functional oxetane components are preferably liquid oxetane resins, and more preferably liquid oxetane resins, or combinations of oxetane resins, that are liquids at about 25° C. Suitable oxetane resins employable herein include aliphatic, alkoxy, aryloxy, silyl, aryl, and alicyclic oxetanes.

Suitable oxetane resins employable herein include aliphatic trimethylolpropane oxetane (TMPO or OXT-101), 3-ethyl-3-phenoxymethyloxetane (OXT 211), 3-ethyl-3-[(2-ethylhexyloxymethyl]oxetane (OXT 212), 3-ethyl-[(triethoxysilylpropoxy)methyl]oxetane (OXT-610), and oxetanyl-silsesquioxane oxetane (OX-SQ) (available from Toagosei Co. Ltd, Tokyo, Japan). These resins may be used singly or in combination of two or more thereof.

Mono-functional Epoxy Component

The ink formulations of the present invention include a mono-functional epoxy component. Suitable mono-functional epoxy components are preferably liquid epoxy resins, or combinations of epoxy resins, that are liquids at about 25° C. Suitable epoxy resins employable herein include bisphenol F epoxy resins, bisphenol A epoxy resins, aromatic epoxy resins, alicyclic epoxy resins, alkyl epoxy resins, allylated bisphenol epoxy resins and any combination or subset thereof. Suitable epoxy resins employable herein include AOE X68 ($C_{16}$-$C_{18}$ monoglycidylether), GD (glycidol), PNO (alpha pineneoxide) and CELLOXIDE 2000, which is vinylcyclohexeneoxide (all available from Daicel Chemical Industries), aliphatic $C_8$-$C_{10}$ monoglycidylether (HELOXY 7), $C_{12}$-$C_{14}$ monoglycidylether (HELOXY 8), butylglycidyl ether (HELOXY 61), 2-ethylhexylglycidylether (HELOXY 116), $C_{10}$ monoglycidyl ester (CARDURA Ni0), o-cresyl glycidyl ether (HELOXY 62), nonylphenol glycidyl ether (HELOXY 64), para-tertbutylphenol glycidyl ether (HELOXY 65) and combinations thereof (HELOXY and CARDURA products are available from Hexion Specialty Chemicals Inc.). In a preferred embodiment the mono-functional epoxy component is the aliphatic $C_8$-$C_{10}$ monoglycidylether.

Mono-functional Ethylenically Unsaturated Component

The ink formulations of the present invention include an aliphatic mono-functional ethylenically unsaturated component. Mono-functional ethylenically unsaturated materials for use in the radiation curable inks include, for example, (meth)acrylates of straight chain, branched chain, or cyclic alkyl alcohols, including polyether alcohols. Specific examples include acrylates of alcohols having more than four carbon atoms, for example lauryl acrylate and stearyl acrylate; (meth)acrylates of polyether alcohols, such as 2-(2-ethoxyethoxy)ethyl acrylate, phenoxyethylacrylate; (meth)acrylates, of heterocyclic alcohols, optionally containing an aliphatic linking group between the (meth)acrylate and the heterocycle, such as tetrahydrofuran acrylate, oxetane acrylate, isobornyl acrylate, cyclopentadiene acrylate, and the like. These resins may be used singly or in combination of two or more thereof. Suitable mono-functional acrylate resins employable herein include SR256, SR285, CD420, and SR506 (available from Sartomer, Exton, Pa.), M100 (available from Rahn U.S.A. Corp, Aurora, Ill.), and combinations thereof.

Monofunctional Vinyl Ether

The ink formulations of the present invention include an aliphatic, aromatic, alkoxy, aryloxy mono-functional vinyl ether and vinyl ether alcohol. Specific examples include vinyl ethers such as Rapi-cure HBVE, hydroxyl butyl vinyl ether, Rapi-cure PEPC, propenylether of propylene carbonate, Rapi-cure DDVE, dodecylvinyl ether, Rapicure CHMVE, cyclohexanedimethanol monovinylether, Rapi-cure CVE, cyclohexyl vinyl ether, Rapi-cure EHVE, 2-ethylhexyl vinylether, Rapi-cure ODVE, octadecylvinylether (all from International Specialty Products, N.J., U.S.A.).

Mono-functional Oligomer

The ink formulations of the present invention include an aliphatic and aromatic mono-functional ethylenically unsaturated component/oligomer. Mono-functional ethylenically unsaturated materials for use in the radiation curable inks include, for example, (meth)acrylates of straight chain, branched chain, or cyclic alkyl alcohols, aromatic acrylic oligomer including polyether alcohols. Examples include CN131, CN152 and CN3100, (available from Sartomer, Exton, Pa.).

Poly-Functional Component (Component 4)

The ink formulation of the present invention includes a poly-functional component, which includes functionality of greater than 2 and which is a tri- or higher-functional, acrylate, a tetra-functional vinyl ether oligomer, a tri or multi-functional epoxy, a hexa-functional polyol, oxetane, or any combination or subset thereof. The amount of poly-functional component in the ink composition of the invention is about 0 to about 95 wt. %, preferably about 5 to about 80 wt. %, and even-more preferably about 8 to about 50 wt. % based on the total weight of the inkjet ink. In one embodiment, the ink composition of the invention is substantially free of poly-functional component.

Multi-functional Acrylates

The ink formulations of the present invention include an aliphatic or aromatic multi-functional ethylenically unsaturated component. Multi-functional ethylenically unsaturated materials for use in the radiation curable inks include, for example, (meth)acrylates of straight chain, branched chain, hyperbranched or cyclic alkyl alcohols of silicones. Examples of which included a silicone hexaacrylate, EBE-CRYL 1360 and a urethane acrylate EBECYRL 1290,(available from Cytec Surface Specialties, West Paterson, N.J.), CN 2302, CN 2303 (Sartomer), BDE 1025, BDE 1029 (Bomar Specialties Co.).

Tetra-functional Vinyl Ether Oligomer

The ink formulations of the present invention include a multi-functional vinyl ether component. For example, VECTOMER 1312 or 5015 which are vinyl ether terminated aliphatic or aromatic ester monomers respectively (available from Morflex, Greensboro, N.C.), and tris(4-vinyloxybutyl) trimellitate.

Tri or Multi-functional Epoxy

The ink formulations of the present invention include an aliphatic, aromatic multi-functional epoxy component. Multi-functional epoxy materials for use in the radiation curable inks include, for example, aliphatic, alkoxy, cycloaliphatic, bisphenol A, multi-functional epoxy. Examples includes HELOXY 48 and HELOXY 505 (homopolymer of 9-Octadecenoic acid, 12-(2-oxiranyl-methoxy)-, 1,2,3-propanetriyl ester) (available from Hexion Specialty Chemicals, Inc.), EPOLEAD GT 401 (alicyclic tetraepoxide, available from Daicel Chemical Industries Ltd.), EHPE 3150 polyester alicyclic epoxy resin which is a condensation products of 1-2-Epoxy-4(2-oxiranyl)-Cyclohexane of 2,2-bis(Hydroxy methyl)1-butanol and is blended/dissolved in (3'-4'-Epoxycyclohexane)methyl 3'-4'-Epoxycyclohexyl-carboxylate (also available from Daicel Chemical Industries Ltd.).

Poly-functional Alcohol

The ink formulations of the present invention may include a poly-functional alcohol component. An example of which is hexafunctional alcohol BOLTORN H 2004 (available from Perstorp specialty chemicals Toledo, Ohio).

Di-functional Component (Component 5)

The ink formulation of the present invention includes a di-functional component. Suitable di-functional monomers include a di-functional acrylate, a di-functional epoxy, a di-functional vinylether, a compound containing both vinylether and acrylate functionality, a component containing both oxetane and acrylate functionality, a component containing both epoxy and acrylate functionality, a di-functional oligomer, a di-functional oxetane or any combination or subset thereof. The amount of di-functional component in the ink composition of the invention is about 0 to about 95 wt. %, preferably about 5 to about 80 wt. %, and even more preferably about 10 to about 50 wt. % based on the total weight of the inkjet ink. In one embodiment, the ink composition of the invention is substantially free of di-functional component.

Di-functional Acrylate Component

The ink formulations of the present invention may include an di-functional acrylate component. Suitable di-functional acrylate components are those that are liquids at a temperature of 25° C. Examples of the acrylate monomers employable herein include tripropyleneglycol diacrylate, neopentyl-glycoldiacrylate, 1,6-hexanediol diacrylate. These monomers may be used singly or in combination of two or more. Examples of acrylate oligomers employable herein include CN9800, a silicone di-acrylate, (available from Sartomer Company, Inc.), and EBECRYL 350, a silicone di-acrylate, (available from Cytec Surface Specialties). These oligomers may be used singly or in combination of two or more.

Di-functional Epoxy Components

The ink formulations of the present invention include an aliphatic, cycloaliphatic, bisphenol A, di-functional epoxy component. Suitable di-functional epoxy components are preferably epoxy monomers, or combinations of epoxy resins, that are liquids at about 25° C. Suitable epoxy resins employable herein include bisphenol F epoxy resins, bisphenol A epoxy resin, alicyclic epoxy resin, alkyl epoxy resin, allylated bisphenol epoxy resin and any combination or subset thereof. Suitable epoxy components employable herein also include HELOXY 66, diglycidylether of 1,6-hexanediol, HELOXY 67 ,1,4-butanediol diglycidyl ether, EPIKOTE 877, polypropylenoxide diglycidyl ether, or HELOXY 68, diglycidyl ether of neopentyl glycol, HELOXY 107, diglycidyl ether of cyclohexane dimethanol, HELOXY 107, EPON resin 826 and EPON resin 828, which are bisphenol diglycidyl ethers, EPON resin 862 and EPON resin 863, which are bisphenol F diglycidyl ethers. (HELOXY, EPIKOTE and EPON products are commercially available from Hexion Specialty Chemicals Inc.) and cycloaliphatic epoxides, such OMNI LANE OC1005 (available from IGM Resins), 7-oxabicyclo[4.1.0]hept-3-ylmethyl ester of 7-oxabicyclo[4.1.0]heptane-3-carboxylic acid (UVACURE 1500 from Cytec Surface Specialties, West Paterson, N.J.), 1-methyl-4-(2-methyloxiranyl)-7-Oxabicyclo[4.1.0]heptane (limonene Dioxide available from Millenium Specialty Chemicals, Hunt Valley, Md.) and combinations thereof. In a preferred embodiment the di-functional epoxy component is the glycidyl ether of neopentyl glycol.

Di-functional Vinylether Components

The ink formulations of the present invention include an aliphatic, cycloaliphatic or alkylaryl di-functional vinylether component. Suitable di-functional vinyl ether components employable herein include Rapi-cure DVE 3, triethyleneglycol divinylether, Rapi-cure CHVE, cyclohexanedimethanol divinylether, Rapi-cure DVE-2, diethyleneglycol divinylether, Rapi-cure DPE-2, dipropyleneglycol divinylether, Rapi-cure HDDVE, hexanediol divinylether, Rapicure DVB 1D, butenediol divinylether (all available from International Specialty Products, N.J., U.S.A.), triethyleneglycol divinylether (DVE3 available from ISP, Guildford, UK), bis[4-(ethenyloxy)butyl]hexanedioic acid ester (VECTOMER 4060 available from Morflex, Greensboro, N.C.), bis[4-(ethenyloxybutyl]ester of 1,3-benzenedicarboxylic acid (VECTOMER 4010 also available from Morflex, Greensboro, N.C.).

Component Containing Both Vinyl Ether and Acrylate Functionality

The ink formulations of the present invention may also optionally include a hybrid component containing both vinyl ether and acrylate functionality. These di-functional monomers are especially useful for decreasing the viscosity of curable compositions. Exemplary di-functional monomers include but are not limited to 2-(2-vinylethoxy)ethyl (meth)acrylate, 2-(2-vinyloxyethoxy)-2-propyl (meth)acrylate, 2-(2-vinyloxyethoxy)-3-propyl (meth)acrylate, 2-(2-vinyloxyethoxy)-2-butyl (meth)acrylate, 2-(2-vinyloxyethoxy)-4-butyl (meth)acrylate, 2-(2-allyloxyethoxy)ethyl (meth)acrylate, 2-(2-allyloxyethoxy)-2-propyl (meth)acrylate, 2-(2-allyloxyethoxyxy)-3-propyl (meth)acrylate, 2-(2-allyloxyethoxy)-2-butyl (meth)acrylate, 2-(2-allyloxyethoxy)-4-butyl (meth)acrylate, 2-(2-vinyloxypropoxy)ethyl (meth)acrylate, 2-(2-vinyloxypropoxy)-2-propyl (meth)acrylate, 2-(2-vinyloxypropoxy)-3-propyl (meth)acrylate, 2-(3-vinyloxypropoxy)ethyl (meth)acrylate, 2-(3-vinyloxypropoxy)-2-propyl (meth)acrylate, 2-(3-vinyloxypropoxy)-3-propyl (meth)acrylate, and any combinations or subset thereof. The compound 2-(2-vinyloxyethoxy)ethyl (meth)acrylate (VEEA and VEEM) is commercially available from Nippon Shokubai Co., Inc, Tokyo, Japan. Combinations comprising at least one of the foregoing can be used.

Component Containing Both Oxetane and Acrylate Functionality

The ink formulations of the present invention may also optionally include a hybrid component containing both Oxetane and acrylate functionality. Exemplary difunctional monomers include but are not limited to OXE-10 (3-ethyl-3-(methylacrylate) oxetane from Osaka Organic Chemical Industries Ltd.

Component Containing Both Epoxy and Acrylate Functionality

The ink formulations of the present invention may also optionally include a hybrid component containing both epoxy and acrylate functionality. Exemplary difunctional monomers include but are not limited to Cyclomer A400 (3,4-epoxy-cyclohexylmethyl acrylate), cyclomer M100 (3,4-epoxy-cyclohexylmethyl methaacrylate), MGMA (Methylglycidylmethacrylate) all from Daicel Chemical Industries and Glycidyl methacrylate from Mitshubishi Rayon Company Ltd., Di-functional Oligomer The ink formulations of the present invention include an aliphatic and aromatic polyester based ethylenically unsaturated oligomer. This could be an aliphatic or aromatic polyester based urethane acrylate diacrylate oligomer, an epoxy acrylate oligomer or combinations thereof.

Di-functional ethylenically unsaturated materials for use in the radiation curable inks include, for example, (meth)acrylates of straight chain, branched chain, or polyester or polyether urethane oligomer or aromatic urethane diacrylate oligomer.

Di-functional Oxetane Components

The ink formulations of the present invention include a di-functional oxetane component. Suitable di-functional oxetane components are preferably liquid oxetane resins, and more preferably liquid oxetane resins, or combinations of oxetane resins, that are liquids at about 25° C. Suitable oxetane resins employable herein include aliphatic, cycloaliphatic, aryl and alicyclic oxetanes. Specific examples of suitable oxetane resins include aliphatic bis[1-ethyl(3-oxetanyl)]methyl ether (OXT-221), 1,4-Bis[(3-ethyl-3-oxetanylmethoxy)methyl]benzene (OXT 121) (both available from Toagosei Co. Ltd, Tokyo, Japan). These resins may be used singly or in combination of two or more thereof.

Ink Formulations

In one embodiment, the ink formulations of the present invention contain a photoinitiator system which includes both a photocation polymerization initiator and a free-radical photoinitiator, an acrylate ester of a carboxylic acid ester, a mono-functional monomer, a tri- or higher-functional monomer, and a di-functional monomer.

In another embodiment, the ink formulations of the present invention contain a mono-functional acrylate, a hydroxyl functional mono-functional acrylate ester of carboxylate acid ester, di-functional epoxy monomers, a di-functional acrylate and tri or higher functional epoxy monomer, or combinations thereof, and is free of tri-functional or higher-functional monomer.

In another embodiment, the ink formulations of the present invention contain a mono-functional acrylate, a hydroxyl functional mono-functional acrylate ester of carboxylate acid ester, a reactive diluent, di-functional epoxy monomers, a di-functional acrylate and tri or higher functional epoxy monomer, or combinations thereof, and is free of tri-functional or higher-functional monomer.

In another embodiment, the ink formulations of the present invention contain a hydroxyl functional mono-functional acrylate ester of carboxylate acid ester, di-functional epoxy monomers, a di-functional acrylate or combinations thereof, and is free of tri-functional or higher-functional monomer.

In another embodiment, the ink formulations of the present invention contain a hydroxyl functional mono-functional acrylate ester of carboxylate acid ester, di-functional epoxy monomers, a reactive diluent, and a di-functional acrylate or combinations thereof, and is free of tri-functional or higher-functional monomer.

In another embodiment, the ink formulations of the present invention contain a hydroxyl functional mono-functional acrylate ester of carboxylate acid ester, mono-functional epoxy monomer, di-functional epoxy monomers, a reactive diluent, or combinations thereof, and is free of tri-functional monomer or higher-functional monomer.

In another embodiment, the ink formulations of the present invention contain a hydroxyl functional mono-functional acrylate ester, di-functional vinyl ether monomer, di-functional epoxy monomers, a reactive diluent, or combinations thereof, and is free of tri-functional monomer.

In another embodiment, the ink formulations of the present invention contain a hydroxyl functional mono-functional acrylate ester of carboxylate acid ester, di-functional vinyl ether monomer, di-functional epoxy monomers, a reactive diluent, or combinations thereof, and is free of tri-functional monomer.

In one embodiment, the ink formulations of the present invention contain mono-acrylate monomers, mono-functional epoxy monomer, mono-functional acrylate oligomer, unreactive diluent, di-functional acrylate oligomer, a tri- or higher functional acrylate monomers, tri- or higher functional epoxy monomers, or combinations thereof, and is free of di-functional monomers.

In one embodiment, the ink formulations of the present invention contain mono-functional acrylate ester of carboxylate acid ester, mono-functional acrylate monomer, mono-functional epoxy monomer, reactive diluent, tri- or higher functional epoxy monomers, or combinations thereof, and is free of di-functional monomers.

In one embodiment, the ink formulations of the present invention contain mono-functional acrylate monomer, mono-functional epoxy monomer, tri or higher hydroxyl functional reactive component, reactive diluent, tri- or higher functional epoxy monomers, or combinations thereof, and is free of di-functional monomers.

In one embodiment, the ink formulations of the present invention contain a mono-functional acrylate ester of carboxylate acid ester, hydroxyl functional mono-functional oxetane monomer, a di-functional oxetane monomer, or combinations thereof, and is free of tri-functional monomer.

In one embodiment, the ink formulations of the present invention contain a hydroxyl functional mono-functional acrylate monomer, hydroxyl functional mono-functional oxetane monomer, a di-functional oxetane monomer, or combinations thereof, and is free of tri-functional monomer.

Reactive/Unreactive Plasticizer

The ink formulations of the present invention may also optionally include a reactive or unreactive plasticizer component based on allyl, vinyl, ethylenic unsaturated, epoxy or alkyloxysilane groups. When utilized, the amount of reactive or unreactive plasticizer in the ink composition of the invention is about 0 to about 25 wt. %, preferably about 1 to about 20 wt. %, and even more preferably about 2 to about 18 wt. % based on the total weight of the inkjet ink.

Silane Adhesion Promoters

The ink formulations of the present invention may also optionally include a silane adhesion promoter to provide high humidity resistance. The silane adhesion promoter contains either a radical or cationically photopolymerizable functional group and provides a covalent bond between the organic resins and inorganic substrates, which results in increased adhesion and enhanced retention of hydrolytic stability and film hardness after the water exposure. The silane promoter is preferably a mono-functional epoxy silane. Examples of suitable silane adhesion promoters include, but are not limited to, those sold under the trade name SILQUEST, commercially available from Momentive Performance Materials, Friendly, W. Va. Specific examples include SILQUEST A-172 (vinyl tri(2methoxy-ethoxy)silane), SILQUEST A-174 (gamma-methacryloxypropyltrimethoxy silane), SILQUEST A-186 beta (3,4 epoxycyclohexyl)ethyltrimethoxy silane), SILQUEST A-189 (gamma-mercaptopropyltrimethoxy silane), A-187 (gamma-Glycidoxypropyl trimethoxysilane), A-1871 or Y-15589 (gamma-Glycidoxypropyl triethoxysilane), Coatosil 1770 [beta-(3,4-epoxycyclohexyl)-ethyl triethoxysilane)], Wetlink 78 (gamma-Glycidoxypropyl methyldiethoxysilane), A171 (vinyl trimethoxysilane), A151 (vinyl triethoxysilane), Coatosil 1706 (vinyl triisopropoxysilane), and the like.

When utilized, the amount of silane adhesion promotor in the ink composition of the invention is about 0 to about 25 wt. %, preferably about 0.05 to about 20 wt. %, and even more preferably about 0.1 to about 15 wt. % based on the total weight of the inkjet ink.

Surfactant

The ink formulations of the present invention may also optionally include a surfactant component based on polysiloxane, acrylate functional polysiloxane, polyacrylate copolymer, acrylate functional fluorocarbon. Suitable examples include Byk 377, Byk 3510, Byk 361N (all Byk products are from Byk Chemie U.S.A. Inc., Wallingford, Conn., U.S.A.), EBECRYL 381, a trifunctional fluorocarbon acrylate, available from Cytec Surface Specialties, Inc. When utilized, the amount of surfactant in the ink composition of the invention is about 0 to about 10 wt. %, preferably about 0.001 to about 8 wt. %, and even more preferably about 0.01 to about 5 wt. % based on the total weight of the inkjet ink.

Defoamer

The ink formulations of the present invention may also optionally include a defoamer based on polysiloxanes. When utilized, the amount of defoamer in the ink composition of the invention is about 0 to about 10 wt. %, preferably about 0.01 to about 8 wt. %, and even more preferably about 0.01 to about 4 wt. % based on the total weight of the inkjet ink.

Stabilizer

The ink formulations of the present invention may also optionally include a stabilizer. These are useful in providing aerobic and unaerobic stability. Examples include but are not limited to Irgastab UV 10, Irgastab UV 22, Irganox 1010, Irganox 1035, and Tinuvin 292 (available from Ciba, New York, N.Y.), Omnistab LS292 (available from IGM Resins, Shanghai, China), 4-methoxyphenol and combinations comprising at least one of the foregoing. When utilized, the amount of stabilizer is about 0 to about 5 wt. %, preferably about 0.001 to about 3 wt. %, and even more preferably about 0.01 to about 1 wt. % based on the total weight of the inkjet ink.

Reactive Diluent

The ink formulations of the present invention may also optionally include a reactive diluent such as alkylene carbonates or butyrolactone. Although not wishing to be bound by theory, the inventors believe these reactive diluents ring open, under acid conditions following UV cure. These are useful in decreasing the viscosity of the curable compositions. Exemplary alkylene carbonates include but are not limited to glycerine carbonates ethylene carbonate, propylene carbonate, butylene carbonate and combinations comprising at least one of the foregoing. When utilized, the amount of alkylene carbonate is about 0 to 25 wt. % based on the total weight of the inkjet ink.

Colorant Compositions

The ink of the invention may further contain a colorant composition comprising a colorant or combination of colorants. Combinations of pigments and dye can be used, provided that the thermal stability of the resulting ink is maintained.

Exemplary pigments include those having the following Color Index classifications: Green PG 7 and 36; Orange PO 5, 34, 36, 38, 43, 51, 60, 62, 64, 66, 67 and 73; Red PR 112, 149, 170, 178, 179, 185, 187, 188, 207, 208, 214, 220, 224, 242, 251, 254, 255, 260 and 264; Magenta/Violet PV 19, 23, 31, and 37, and PR 122, 181 and 202; Yellow PY 17, 120, 138, 139, 155, 151, 168, 175, 179, 180, 181 and 185; Blue PB 15, 15:3, 15:4, 15:6; Black PB 2, 5 and 7; carbon black; titanium dioxide (including rutile and anatase); zinc sulfide, and the like.

Other specific pigments include, for example, IRGALITE BLUE GLVO, MONASTRAL BLUE FGX, IRGALITE BLUE GLSM, HELIOGEN BLUE L7101F, LUTETIA CYANINE ENJ, HELIOGEN BLUE L6700F, MONASTRAL GNXC, MONASTRAL GBX, MONASTRAL GLX, MONASTRAL 6Y, IRGAZIN DPP ORANGE RA, NOVAPERM ORANGE H5G70, NOVPERM ORANGE HL, MONOLITE ORANGE 2R, NOVAPERM RED HFG, HOSTAPERM ORANGE HGL, PALIOGEN ORANGE L2640, SICOFAST ORANGE 2953, IRGAZIN ORANGE 3GL, CHROMOPTHAL ORANGE GP, HOSTAPERM ORANGE GR, PV CARMINE HF4C, NOVAPERM RED F3RK 70, MONOLITE RED BR, IRGAZIN DPP RUBINE TR, IRGAZIN DPP SCARLET EK, RT-390-D SCARLET, RT-280-D RED, NOVAPERM RED HF4B, NOVAPERM RED HF3S, NOVAPERM RD HF2B, VYNAMON RED 3BFW, CHROMOPTHAL RED G, VYNAMON SCARLET 3Y, PALIOGEN RED L3585, NOVAPERM RED BL, PALIOGEN RED 3880 HD, HOSTAPERM P2GL, HOSTAPERM RED P3GL, HOSTAPERM RED E5B 02, SICOFAST RED L3550, SUNFAST MAGENTA 122, SUNFAST RED 122, SUNFAST VIOLET 19 228-0594, SUNFAST VIOLET 19 228-1220, CINQUASIA VIOLET RT-791-D, VIOLET R NRT-201-D, RED B NRT-796-D, VIOLET R RT-101-D, MONOLITE VIOLET 31, SUNFAST MAGENTA 22, MAGENTA RT-243-D, MAGENTA RT 355-D, RED B RT-195-D, CINQUASIA CARBERNET RT-385-D, MONOLITE VIOLET R, MICROSOL VIOLET R, CHROMOPTHAL VIOLET B, ORACET PINK RF, IRGALITE YELLOW 2GP, IRGALITE YELLOW WGP, PV FAST YELLOW HG, PV FAST YELLOW H3R, HOSTAPERM YELLOW H6G, PV FAST YELLOW, PALIOTOL YELLOW D1155 and IRGAZIN YELLOW 3R.

A number of different carbon black type pigments are commercially available, for example and carbon blacks such as SPECIAL BLACK 100, SPECIAL BLACK 250, SPECIAL BLACK 350, FW1, FW2 FW200, FW18, SPECIAL BLACK 4, NIPEX 150, NIPEX 160, NIPEX 180, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Degussa, Parsippany, N.J., MOGUL L, REGAL 400R, REGAL 330, and MONARCH 900, available from Cabot Chemical Co., Boston, Mass., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, Tokyo, Japan, RAVEN 2500 ULTRA, Carbon black 5250, and Carbon Black 5750 from Columbia Chemical Co., Brunswick, Ohio, and the like.

A number of titanium oxide pigments are also known. Nanostructured titania powders may be obtained, for example, from Nanophase Technologies Corporation, Burr Ridge, Ill., or under the trade names KRONOS® 1171 from Kronos Titan, Cranbury, N.J. As will be described in more detail below, titanium dioxide particles are prone to settling, and are therefore often surface treated. The titanium oxide particles can be coated with an oxide, such as alumina or silica, for example. One, two, or more layers of a metal oxide coating may be used, for example a coating of alumina and a coating of silica, in either order. This type of coated titanium oxide is commercially available from E.I. du Pont de Nemours and Company, Wilmington, Del., under the trade name R960 or R902. In the alternative, or in addition, the titanium oxide particles may be surface treated with an organic compatibilization agent such as a zirconate, titanate, silanes, silicones, and the like. Surface treatment of titanium dioxide coated with alumina includes, for example, a silicone surface treatment, preferably a dimethicone treatment using dimethicone oil or a stearic acid surface treatment. Stearic acid and alumina coated ultrafine titanium dioxide particles are commercially available, such as UV-Titan M160 from Presperse, Inc., South Plainfield, N.J. Suitable silanes include, for example, trialkoxysilanes, for example 3-(trimethoxysilyl) propyl methacrylate, which is available commercially from Dow Chemical Company, Wilmington, Del. under the trade name Z6030. The corresponding acrylate may also be used. Suitable titanium dioxides may include a decyltrimethoxysilane (DTMS) treated titanium dioxide (40 nanometer average particle diameter) from Tayca Corporation, Osaka, Japan, TD3103 treated titanium dioxide available from Tayca Corporation, the titanium dioxides available from NANOTEK or Nanophase Technologies Corporation. Surface-treated titanium oxide hydroxide (TiO(OH)$_2$) with a 30 nanometer particle size is available as STT100H™ from Titan Kogyo). White pigments such as Zinc sulfide and mixtures thereof with TiO2 can also be used as a pigment.

The pigments are pre-dispersed prior to incorporation into the ink, generally in one or more of the radiation curable materials used in the radiation curable composition. For example, the pigment can be dispersed in a mono-functional ethylenically unsaturated materials. Mono-functional ethylenically unsaturated materials for use in the pigment dispersion include, for example, (meth)acrylates of straight chain, branched chain, or cyclic alkyl alcohols, including polyether alcohols. Specific examples include acrylates of alcohols having more than four carbon atoms, for example lauryl acrylate and stearyl acrylate; (meth)acrylates of polyether alcohols, such as 2-(2-ethoxyethoxy)ethyl acrylate, phenoxyethylacrylate; (meth)acrylates, of heterocyclic alcohols, optionally containing an aliphatic linking group between the (meth)acrylate and the heterocycle, such as tetrahydrofuran acrylate, oxetane acrylate, isobornyl acrylate, cyclopentadiene acrylate, and the like.

In addition, we can use mono-functional materials such as HELOXY 7, include aliphatic C8-C10 monoglycidylether (HELOXY 7), C12-C14 monoglycidylether (HELOXY 8), butylglycidyl ether (HELOXY 61), 2-ethylhexylglycidylether (HELOXY 116) and combinations thereof. All commercially available from Hexion Specialty Chemicals Inc., Columbus Ohio.

Optionally multi-functional material such as tripropylene glycol diacrylate (TPGDA (available from BASF, Florham Park, N.J.)), a propoxylated neopentyl glycol diacrylate, a hyperbranched oligomers and aliphatic epoxy monomers such as diglycidylether of 1,6-hexanediol (HELOXY 66), 1,4-butanediol diglycidyl ether (HELOXY 67), polypropylenoxide diglycidyl ether (EPIKOTE 877) or diglycidyl ether of neopentyl glycol (HELOXY 68), 2-ethylhexyl glycidyl ether, neodecanoic acid glycidyl ether, 2-(2-vinyloxyethoxy)ethyl (meth)acrylate (VEEA and VEEM (available from Nippon Shokubai, Osaka, Japan)) and the like. All HELOXY and EPIKOTE materials are commercially available from Hexion Specialty Chemicals Inc., Columbus, Ohio. Other additives may be present to aid in dispersion of the pigments, for example AB-type block copolymers of an alkyl acrylate and a methyl methacrylate). Generally, the pigment comprises about 5 to about 60% of the dispersion.

In order to provide a better understanding of the present invention including representative advantages thereof, the following examples are offered. It is understood that the examples are for illustrative purposes and should not be regarded as limiting the scope of the invention to any specific materials or conditions.

EXAMPLES

Procedure for Static Surface Tension

The static surface tension was measured at thermal, chemical, and mechanical equilibrium between the ink and the measurement instrument, and can correlate to how easily the ink drop wets the substrate onto which it is jetted. Various methods can be used to determine static surface tension, for example the du Nouy method is known in the art. The inks of the invention may have a static surface tension of about 20 to about 45 dynes per centimeter, preferably about 21 to about 40 dynes per centimeter, and more preferably about 22 to about 38 dynes per centimeter at 25° C.

Procedure for Adhesion Testing

Crosshatch adhesion was determined according to the following procedure. A film of an ink is prepared at a thickness of 9 micrometers using a #6 Mayer, cured using a mercury vapor lamp at a dose of 700 mJ/cm$^2$, H lamp, and conditioned for 16-24 hours at 25° C. (±2° C.), and at a relative humidity of 50% (±5%). A series of 6 parallel incisions of 2 to 2.5 cm in length and spaced 2.0 mm apart was made in the film using a suitable cutting tool such as a Gardco PA-2000 cutting tool with 6 parallel blades, followed by a second set of incisions of the same dimensions and rotated 90° to the first set. In this way a crosshatch pattern was obtained, then cleaned using a brush or compressed air to remove particulate contaminants. A length of 7 to 8 cm of a suitable tape, such as 3M 610 tape from 3M Corporation, was applied to the crosshatched area and rubbed smooth to remove any trapped air bubbles, and to ensure a good contact. The tape was then pulled off within 90 seconds (±30 seconds) upon application to the crosshatched area. The crosshatch areas are then quantified according to the method of ASTM D3359 where "5B" refers to the best adhesion and "0B" refers to the worst adhesion. The results were quantified according to Table A below.

TABLE A

| Results | Squares removed |
|---------|-----------------|
| 5B | 0% removed |
| 4B | <5% removed |
| 3B | 5-15% removed |
| 2B | 15-35% removed |
| 1B | 35-65% removed |
| 0B | 65-100% removed |

Procedure for Elongation Measurement

Elongation was measured using an Instron tensile tester using a 100 Newton load cell and a crosshead speed of 300 mm/min. Samples were prepared on Scotchcal 220 vinyl and were either draw downs, or prepared by jetting. The draw-downs were done using a 12 micron rod on K-coater proofer at speed 4.5, cured on the Hanovia H lamp at 700 mJ/cm$^2$. Strips of ¼" width were cut and placed in the grips which were set 40 mm apart. The test was stopped when the vinyl broke, the ink was observed to fracture, or the color of the ink was observed to fade or whiten. The percent elongation was measured at the point where the test is stopped. Polycarbonate was also be used as the substrate where the Instron tester is equipped with an oven. Once the ink/polycarbonate sample is placed in the grips, the sample was needs heated to 150° C. to soften the polycarbonate and allow it to be easily stretched. In one embodiment, the ink compositions of the invention have an elongation of at least 20% and preferably at least 40%.

Procedure for Viscosity

The viscosity of the ink was determined using a Haake Roto Visco 1 and a TCP/P—Peltier Temperature Control Unit. The viscosity was obtained at a temperature of 25° C. and the results are provided in centipoises (cP). In one embodiment, the ink of the invention may have a viscosity of less then 70 cPs, preferably about 5 to about 70 cPs, preferably about 10 to about 50 cP, and more preferably about 12 to about 25 cPs, at 25° C.

Procedure for MEK Rubs

The MEK (methyl ethyl ketone) rub technique is a method for assessing the solvent resistance of a cured ink by incorporating ASTM D4752 into ASTM D3732-82. The ink to be cured was applied to the substrate using #6 Mayer Rod. The coated film was cured at a dose of 700 mJ/cm$^2$ using a Fusion H lamp, max power was 600 Watts/inch, (dosage recorded by PowerMap). Test areas on the ink film surface of at least 2 inches long were selected for testing. The ball end of a hammer wrapped in two thicknesses of cheesecloth is saturated to a dripping wet condition with the MEK. The wet ball end is rubbed across the 2-inch portion of the cured film, one forward and one backward movement constitutes a single rub. The surface is rubbed until the ink has been completely removed from any point along the test area Degree of Cure The degree of cure of the ink was determined by measuring percent reacted epoxy, vinyl ether, oxetane and acrylate peak of the cured ink at ca. 909, 1620, 985 and 1407 cm$^{-1}$ respectively using a Nicolet 860 Magna FT-IR bench equipped with a Dura sample IR II ATR (Diamond). A drop of liquid ink was placed onto the diamond ATR crystal and a spectrum of the unreacted liquid was obtained. A cured film of ink was prepared for spectral analysis by forming a film having a thickness of about 7-10 micrometers using #6 Mayer rod draw-downs substrate. The ink film was then cured using a Fusion H lamp, max power was 600 Watts/inch, at a dose of 700 mJ/cm$^2$. The cured ink film was removed from the substrate and the top surface and the bottom surface of the film (the face adjacent to the substrate) was measured for degree of cure, with 100% equaling fully cured and 0% equaling absence of cure. A film is considered to be "substantially cured" when greater than 80%, preferably greater than 90% of curable functional groups undergo conversion.

The degree of cure at the top surface of the film is determined by cutting a piece of film (about ½"×½") and having the top surface of the film face the diamond ATR crystal while a spectrum is obtained. The degree of cure at the face of the film opposite to the surface was obtained by facing the bottom surface of the film to the diamond ATR crystal while a spectrum is obtained. The peak for the acrylate double bond was observed in the liquid ink at about 1407 cm$^{-1}$. The area of the peak is measured starting from about 1424 cm$^{-1}$ to 1393 cm$^{-1}$. Peak area at 1407 cm$^{-1}$ for the cured ink top as well as bottom surface was also measured similar to the procedure for the liquid ink.

The degree of cure is calculated using the following formulas:

% cure for Top Surface=[1−(Area 1407 cm$^{-1}$ top/Area 1407 cm$^{-1}$ liquid)]×100, and % cure for Bottom Surface=[1−(Area 1407 cm$^{-1}$ bottom/Area 1407 cm$^{-1}$ liquid)]×100.

A similar procedure is also used for measuring degree of cure for the epoxy functional group by measuring the peak area at about 909 cm$^{-1}$, for the oxetane group at 985 cm$^{-1}$ and for the vinyl ether group at 1620 cm$^{-1}$.

Ink drawdowns using a #6 Mayer rod on the substrate were cured with Hanovia mercury vapor (H) lamp at 700 mJ/cm$^2$ energy density.

Procedures for Water and Steam Resistance

The tin side of a glass plate was determined using a EDTM TS 1300 Tin side detector. When the glass is placed above the UV lamp of the detector, the tin side fluoresces whereas the air side does not fluoresce. Ink drawdowns, on air and/or tin side of the glass, were done using a #6 Mayer rod on the substrate and were cured with Fusion H lamp at 700 mJ/cm$^2$ energy density max power was 600 Watts/inch, (dosage recorded by PowerMap). The drawdowns were post-cured for one minute at 100° C. then the cured coating was left at room temperature for 24 hours, then used for the water and steam resistance tests below.

Hot water resistance: The cured coating was immersed in an 80° C. hot water bath for 30 minutes. After removal from the water, the coating was wiped with a paper towel. Crosshatch adhesion was checked by ASTM D3359-97 (Test method B).

Hot steam resistance: The cured coating was exposed to steam vapors from a boiling water bath for 15 minutes. After removal from the steam, the coating was wiped with a paper towel. Crosshatch adhesion was checked by ASTM D3359-97 (Test method B).

Water resistance: The cured coating was either left at room temperature for 24 hours or a predetermined time interval as indicated in Table 16. The coating was then immersed in room temperature (20° C.) deionized water bath for 72 hours. After removal from the water, the coating was wiped with a paper towel. Crosshatch adhesion was checked ASTM D3359-97 (Test method B).

Procedure for Pencil Hardness

Ink drawdowns, on air and/or tin side of glass, were done using a #6 Mayer rod on the substrate, and were cured with Fusion H lamp at 700 mJ/cm$^2$ energy density max power was 600 Watts/inch, (dosage recorded by PowerMap). The drawdowns were post-cured for one minute at 100° C. and the cured coating was left at room temperature for 24 hours or for a time period as mentioned in Table 16. The cured coating was immersed in deionized water at 20° C. for 72 hours, wiped off with paper towel and pencil hardness tested as per ASTM 3363-92a. The pencil hardness prior to water immersion listed in Table 17 were also measured using ASTM 3363-92a test method. In one embodiment, the ink compositions of the invention, when cured, have a pencil hardness of at least B, as measured using ASTM 3363-92A, after immersion in deionized water at 20° C. for 72 hours.

Procedure for Jet Operating Window

Jet Operating Window was measured on a Fujifilm Dimatix/Spectra S class printhead. The firing frequency can be from 1 Hz to 32 kHz using a (waveform) rise/fall time of 4 microseconds and fire pulse width of 8 microseconds. Jet Operating Window (JOW) is defined by the printhead voltage and temperature conditions where all 128 jets fire constantly for 3 minutes with at most 6 nozzles dropping out. If 6 or more nozzles were, lost it is considered a fail.

In one embodiment, the radiation curable ink compositions of the invention have a jet operating window, at a jetting frequency of at least about 1 Hz to about 32 kHz, and exhibit stable jetting after residing in the printhead for a period of at least 1 day. In another embodiment, the radiation curable ink compositions of the invention have a jet operating window, at a jetting frequency of at least about 1 Hz to about 16 kHz, and exhibit stable jetting, after residing in the printhead for a period of at least 1 day.

Ink Components

In the Tables presented herein, Irgastab UV10, MeHq and Irganox 1035 are stabilizers, Irgacure 819 is phosphine oxide photoinitiator both available from Ciba Specilaty Chemicals. BYK 3510, BYK 361N and BYK 377 are surfactants, and BYK 088 and BYK 080A are defoamers, all commercially available from BYK-Chemie, Wallingford, Conn. Diethoxyanthracene is available from Acros Organics. 4-methoxyphenol is a free radical stabilizer available from Sigma-Aldrich, Inc. ITX is a photosensitizer, isopropylthioxanthone available commercially from Sartomer Company, Inc. as ESACURE ITX. SR256 is 2-(ethoxyethoxy)ethylacrylate and SR 351 is a tri-functional acrylate both available from Sartomer Company. UVACURE 1500 is a cycloaliphatic diepoxy commercially available from Cytec Surface Specialties. Cationic photoinitiator UVACURE 1600 is based on iodonium salts, Ebecryl 1360 is silicone hexacrylate also commercially available from Cytec Surface Specialties. GENOCURE MBF is a glyoxolate based free radical initiators used for crosslinking commercially available from Rahn Corporation. HELOXY 7 is a mono-functional epoxy monomer, HELOXY 68 is a di-functional epoxy monomers, specifically a neopentylglycol diglycidyl ether, HELOXY 48 is a tri-functional epoxy monomer, specifically a a tri-functional aliphatic glycidyl ether, and ACE monomer is an acrylate ester of glycidyl ester of neodecanoic acid with a hydroxyl group on one of the side chains of the molecule. HELOXY 7, HELOXY 68, HELOXY 48 and ACE are available from Hexion Specialty Chemicals Inc., Columbus, Ohio. BOLTORN H2004 is a dendritic polymer with six hydroxyl groups, available from Perstorp Specialty Chemicals. CD 420 is a mono-functional monomer, SR 506 is isobornyl acrylate, CN131 is a mono-functional oligomer, CN 966J75 is a di-functional aliphatic polyester based urethane diacrylate oligomer available from Sartomer Company. Neodene 16 is 1-hexadecene, commercially available from Shell Chemical Company. CELLOXIDE 2000 is vinylcyclohexeneoxide, commercially available from Daicel Chemical Industries. Omnicat BL 550 is a sulfonium cationic photoinitiator available from IGM resins. OXT-221 is from Toagosei Company, Ltd., TMPO is from Perstorp Specialty company. 4-HBA is from Osaka Organic Chemical.

UVI 6992 is a sulfonium photoinitiator available from Dow Chemical Company. Miramer M 100 is caprolactone acrylate from Rahn Corporation. Rapicure DVE 3 is from International Specialty Products. Silquest TEOS pure silane is from General Electric Silicones. Propylene carbonate is a reactive diluent available from Lyondell Chemical Company. Lucirin TPO-L is available from BASF Corporation. The Cyan dispersion is 20% cyan pigment in TPGDA or phenoxyethylacrylate. The red, green and blue dispersions are 15% pigment in Heloxy 68 and the white dispersion is 50% TiO2 in Heloxy 68. NNBBD15-1 is a 15:3 copper phthalocyanine based cyan pigment at 20% concentration dispersed in tripropylene glycoldiacrylate.

A-186 is a cycloaliphatic epoxy based silane, A-172 is a vinyl group based silane, A-174 is methacryloxypropyl based silane for promoting adhesion A-172, (available from Momentive Performance Materials, Friendly, W. Va. under the trade name SILQUEST).

Example 1

Ink compositions of the invention, based upon di-functional epoxies, are provided in Table 1.

TABLE 1

Inks Based on Di-functional Epoxies.

| Raw material | 1A | 1B | 1C | 1D | 1E | 1F | 1G | 1H | 1J |
|---|---|---|---|---|---|---|---|---|---|
| Irgastab UV10 | | | | | 0.02 | | | | |
| Byk361N | 0.05 | 0.05 | 0.05 | 0.03 | 0.05 | 0.05 | | | |
| Byk377 | | | | | | | 0.025 | 0.025 | 0.05 |
| Byk088 | | | | | | | | | |
| Byk 080A | 0.50 | 0.05 | 0.05 | 0.09 | 0.025 | 0.05 | | | |
| 4-methoxyphenol | 0.05 | 0.05 | 0.05 | 0.04 | 0.025 | 0.05 | 0.025 | 0.025 | 0.05 |
| UVACURE1500 | | | | | | | 21.45 | 24.75 | 24.4 |
| UVACURE1600 | 4.00 | | | 3.5 | | | | 4 | 4 |
| Esacure ITX (SR 1124) | 1.50 | | | 1.2 | | | | 1.2 | 1 |
| Heloxy 68 | 60.00 | 43.35 | 47.6 | 52.15 | 54.68 | 43.35 | 26 | 18 | 20 |
| ACE monomer | 17.40 | 15 | 15 | 14.25 | 15 | 15 | 9 | 9 | 15 |
| Genocure MBF | 4.00 | 5 | 5 | 4.49 | 5 | 5 | 4 | 4 | 4 |
| SR256 | | | | | | | 9 | 6 | |
| Irgacure 819(CIBA) | | | | | | | | 1 | 0.5 |
| Onmicat BL550 | | 16 | 13 | 17.82 | | 16 | 18 | | |
| propylene carbonate | | 8 | 8 | | 8 | 8 | | 8 | 7 |
| cyan dispersion 1 | 12.50 | | | | 12.5 | | 12.5 | | |
| Yellow dispersion 1 | | | | | | 12.5 | | | |
| Black dispersion 1 | | | 11.25 | | | | | | |
| magenta dispersion 1 | | 12.5 | | 11.13 | | | | | |
| White dispersion 1 | | | | | | | | 24.0000 | 24 |
| Total | 100.000 | 100.000 | 100.000 | 100.000 | 100.000 | 100.000 | 100.000 | 100.000 | 100.000 |

Example 2

Ink compositions of invention, based upon mono-functional and poly-functional monomers, are provided in Table 2.

TABLE 2

Inks Based on Mono-functional and Poly-functional Monomers.

| Raw Material | 2A | 2B |
|---|---|---|
| Byk377 | 1 | 1 |
| 4-methoxyphenol | 0.025 | 0.025 |
| Esacure ITX (SR 1124) | 1 | 1 |
| UVACURE1600 | 4 | 4 |
| ACE | 24.475 | 0 |
| Genocure MBF | 5 | 5 |
| Heloxy 48 | 31 | 36 |
| Heloxy 7 | 14 | 25.475 |
| Propylene carbonate | 7 | 7 |
| Boltorn H 2004 | | 8 |
| Cyan Dispersion 2 | | |
| magenta dispersion 2 | | 12.5 |
| yellow dispersion 2 | 12.5 | |
| Total | 100.000 | 100.000 |

Example 3

An ink composition of the invention, based upon mono-functional and poly-functional monomers, is also provided in Table 3.

TABLE 3

Inks Based on Mono-functional and Poly-functional Monomers.

| Raw Material | 3A |
|---|---|
| CD420 | 28 |
| CN131 | 10 |
| Esacure ITX (SR 1124) | 1 |
| UVACURE1600 | 4 |
| Neodene 16 (1-hexadecene) | 2 |
| Genocure MBF | 4 |
| CN966J75 | 4 |
| Irgacure 819 | 1 |
| Lucirin TPO | 3 |
| SR506 | 15 |
| Ebecryl 1360 | 4 |
| Heloxy 48 | 5 |
| Heloxy 7 | 6 |
| black dispersion 2 | 13 |
| Total | 100.00 |

Example 4

Ink compositions of the invention, based upon HELOXY 68 dispersions, are provided in Table 4.

TABLE 4

Inks Based on HELOXY 68 Dispersions.

| Raw material | 4A | 4B | 4C | 4D | 4E | 4F | 4G | 4H |
|---|---|---|---|---|---|---|---|---|
| Byk 377 | 0.08 | 0.08 | 0.08 | 0.08 | 0.08 | 0.08 | 0.08 | 0.08 |
| 4-methoxyphenol | 0.02 | 0.02 | 0.02 | 0.02 | 0.02 | 0.02 | 0.02 | 0.02 |
| ITX | 1.2 | | 1.2 | | 1.2 | 1 | 1.2 | 1 |
| UVACURE1600 | 4 | | 4 | | 4 | | 4 | |
| Omnicat BL 550 | | 40 | | 40 | | | | |
| UVI 6992 | | | | | | 10 | | 10 |
| Miramer 100 | | | | | 5 | 5 | | |
| Rapicure DVE 3 | | | | | 59 | 63.2 | 56 | 60.2 |
| Sliquest TEOS pure silane | | | 16 | 16 | | | | |
| Genocure MBF | 4 | 4 | 4 | 4 | 4 | 4 | 4 | 4 |
| Heloxy 68 | 34 | 8.2 | 34 | 8.2 | | | | |
| Heloxy 7 | 16 | 16 | | | | | | |
| Propylene carbonate | 19 | 10 | 19 | 10 | 10 | | 10 | |
| ACE | 5 | 5 | 5 | 5 | | | 8 | 8 |
| Red dispersion | 16.7 | | | 16.7 | 16.7 | 16.7 | 16.7 | 16.7 |
| Green dispersion | | 16.7 | | | | | | |
| Blue Dispersion | | | 16.7 | | | | | |
| Total | 100.000 | 100.000 | 100.000 | 100.000 | 100.000 | 100.000 | 100.000 | 100.000 |

Example 5

Ink compositions of the invention, based upon oxetane and ACE monomer, are provided in Table 5.

TABLE 5

Oxetane and ACE based inks.

| Raw Materials | 5A Cyan | 5B Magenta | 5C Yellow | 5D Black |
|---|---|---|---|---|
| Byk 3510 | 0.05 | 0.05 | 0.05 | 0.05 |
| OXT-221 | 50.65 | 50.65 | 50.65 | 60.65 |
| ACE Monomer | 14 | 14 | 14 | 14 |
| TMPO | 10 | 10 | 10 | 0 |
| Genocure MBF | 5 | 5 | 5 | 5 |
| Uvacure 1600 | 4 | 4 | 4 | 4 |
| ITX | 1.2 | 1.2 | 1.2 | 1.2 |
| MEHQ | 0.1 | 0.1 | 0.1 | 0.1 |
| Cyan Dispersion 1 | 15 | | | |
| Magenta Dispersion 1 | | 15 | | |
| Yellow Dispersion 1 | | | 15 | |
| Black dispersion 1 | | | | 15 |
| Total | 100 | 100 | 100 | 100 |

Example 6

Properties of the oxetane and ACE based compositions of Table 5 are provided in Table 6.

TABLE 6

Properties of oxetane inks from Table 5.

| | 5A Cyan | 5B Magenta | 5C Yellow | 5D Black |
|---|---|---|---|---|
| MEK Rubs | | | | |
| Substrates | | | | |
| Dynacoat primer on Aluminum | 22 | 10 | 27 | NM |
| PET (Tekra) | 22 | 1 | 1 | 66 |
| PC (Tekra) | 16 | 9 | 9 | 77 |
| Vinyl (Gerber) | 27 | 15 | 15 | 33 |
| Glass | 8 | 10 | 10 | 22 |
| Adhesion | | | | |
| Dynacoat primer on Aluminum | 4B | 5B | 5B | NM |
| PET (Tekra) | 5B | 5B | 5B | 5B |
| Vinyl (Gerber) | 3B | 5B | 2B | 5B |
| Glass | 5B | 5B | 5B | 0B |
| Testing | | | | |
| % Elongation | 68 | 80 | 97 | 40 |
| Ink viscosity @ 25 C | 22.6 | 33.7 | 28.5 | 14.2 |

NM: indicates not measured

Example 7

Ink compositions of Invention, based upon Oxetane, are Provided in Table 7.

TABLE 7

Oxetane based inks

| Raw Materials | 7A Cyan | 7B Cyan | 7C Magenta | 7D Magenta | 7E Yellow | 7F Yellow | 7G Black | 7H Black |
|---|---|---|---|---|---|---|---|---|
| Byk 3510 | 0.05 | 0.05 | 0.05 | 0.05 | 0.05 | 0.05 | 0.05 | 0.05 |
| OXT-221 | 50.65 | 49.9 | 50.65 | 49.9 | 50.65 | 49.9 | 55.65 | 54.9 |
| 4-HBA | 14 | 14 | 14 | 14 | 14 | 14 | 14 | 14 |
| TMPO | 10 | 10 | 10 | 10 | 10 | 10 | 10 | 10 |
| Darocur MBF | 5 | 5 | 5 | 5 | 5 | 5 | 5 | 5 |
| UVACURE 1600 | 4 | 4 | 4 | 4 | 4 | 4 | 4 | 4 |
| ITX | 1.2 | 1.2 | 1.2 | 1.2 | 1.2 | 1.2 | 1.2 | 1.2 |
| MEHQ | 0.1 | 0.1 | 0.1 | 0.1 | 0.1 | 0.1 | 0.1 | 0.1 |
| 9,10-Diethoxy anthracene | | 0.75 | | 0.75 | | 0.75 | | 0.75 |
| Cyan Dispersion 1 | 15 | 15 | | | | | | |
| Magenta Dispersion 1 | | | 15 | 15 | | | | |
| Yellow Dispersion 1 | | | | | 15 | 15 | | |
| Black dispersion 1 | | | | | | | 10 | 10 |
| Total | 100 | 100 | 100 | 100 | 100 | 100 | 100 | 100 |

Example 8

Properties of the oxetane based compositions of Table 7 are provided in Tables 8 thru 11.

TABLE 8

Properties of Cured Hybrid Ink Without Photosensitizer 9,10-diethoxyanthracene.

| | 7A Cyan | | 7C Magenta | | 7E Yellow | | 7G Black | |
|---|---|---|---|---|---|---|---|---|
| Substrates | MEK rub | CrossHatch Adhesion | MEK rub | CrossHatch Adhesion | MEK rub | CrossHatch Adhesion | MEK rub | CrossHatch Adhesion |
| PET | 3 | 5B | 6 | 5B | 8 | 5B | 40 | 5B |
| Vinyl | 2 | 1B | 5 | 5B | 3 | 2B | 4 | 1B |
| Glass | 4 | 5B | 5 | 5B | 5 | 5B | 9 | 5B |
| Aluminum | 3 | 0B | 3 | 0B | 3 | 0B | 3 | 0B |
| Stainless Steel | 3 | 0B | 3 | 0B | 3 | 0B | 6 | 0B |

TABLE 9

Properties of Cured Hybrid Ink Without Photosensitizer 9,10-diethoxyanthracene.

| | 7B Cyan | | 7D Magenta | | 7F Yellow | | 7H Black | |
|---|---|---|---|---|---|---|---|---|
| Substrates | MEK rub | CrossHatch Adhesion | MEK rub | CrossHatch Adhesion | MEK rub | CrossHatch Adhesion | MEK rub | CrossHatch Adhesion |
| PET | 3 | 5B | 3 | 5B | 4 | 5B | 52 | 5B |
| Vinyl | 3 | 1B | 3 | 3B | 5 | 1B | 6 | 1B |
| Glass | 5 | 5B | 4 | 5B | 3 | 5B | 9 | 5B |
| Aluminum | 3 | 0B | 3 | 0B | 3 | 0B | 3 | 0B |
| Stainless Steel | 3 | 0B | 3 | 0B | 3 | 0B | 7 | 0B |

TABLE 10

% Elongation over the vinyl substrate and ink viscosity

| Testing | 7A Cyan | 7B Cyan | 7C Magenta | 7D Magenta | 7E Yellow | 7F Yellow | 7G Black | 7H Black |
|---|---|---|---|---|---|---|---|---|
| $\eta$ @ 25° C. | 16.13 | 16.54 | 26.3 | 26.28 | 21.85 | 22.05 | 15.22 | 15.71 |
| Average Elongation | 108% | 108% | 123% | 167% | 133% | 120% | 78% | 113% |

TABLE 11

Time (secs) to reach tack free surface upon UV irradiation over different substrates.

| Substrates | 7A Cyan | 7B Cyan | 7C Magenta | 7D Magenta | 7E Yellow | 7F Yellow | 7G Black | 7H Black |
|---|---|---|---|---|---|---|---|---|
| PET | 0 | 0 | 0 | 0 | 0 | 0 | 0 | 0 |
| Vinyl | 0 | 0 | 0 | 0 | 0 | 0 | 0 | 0 |
| Glass | 60 | 60 | 60 | 60 | 60 | 60 | 3 | 3 |
| Aluminum | 1 | 0 | 1 | 1 | 15 | 15 | 1 | 0 |
| Stainless Steel | 20 | 5 | 10 | 0 | 0 | 0 | 0 | 0 |

Example 9

Ink Compositions 9A-9F and 9H of the invention, containing a silane adhesion promoter, and comparative composition 9G, without the silane adhesive promoter, and are provided in Table 12.

TABLE 12

Cyan Inks with Silane Adhesion Promoter.

| Raw Materials | 9A | 9B | 9C | 9D | 9E | 9F | Comp. 9G | 9H[1] |
|---|---|---|---|---|---|---|---|---|
| Irgastab UV10 | 0.02 | 0.02 | 0.02 | 0.02 | 0.02 | 0.02 | 0.02 | 0.02 |
| MeHq | 0.02 | 0.02 | 0.02 | 0.02 | 0.02 | 0.02 | 0.02 | 0.02 |
| Irganox1035 | 0.4 | 0.4 | 0.4 | 0.4 | 0.4 | 0.4 | 0.4 | 0.4 |
| A186 | 2 | 2 | 2 | 2 | 2 | 2 |  | 2 |
| Byk 361 N |  |  |  |  |  |  | 0.06 | 0.06 |
| Byk 377 | 0.05 | 0.05 | 0.05 | 0.05 |  |  | 0.2 | 0.2 |
| Genocure MBF | 4 | 4 | 4 | 4 | 4 | 4 | 4 | 4 |
| Heloxy 68 | 39.01 | 39.01 | 39.01 | 39.01 | 39.26 | 39.26 | 41 | 41 |
| Heloxy 48 |  |  | 5 |  |  |  |  |  |
| Propylene carbonate | 10 |  |  | 7 | 10 | 10 | 10 | 10 |
| Celloxide 2000 |  | 19 |  |  |  |  |  |  |
| Eb 1360 |  |  |  |  | 1 | 1 |  |  |
| SR351 |  |  |  |  |  | 7.8 |  |  |
| Uvacure 1500 |  |  | 14 | 12 |  |  |  |  |
| ACE | 14 | 5 | 5 | 5 | 12.8 | 5 | 14 | 14 |
| Omnicat BL-550 | 18 | 18 | 18 | 18 | 18 | 18 | 17.8 | 17.8 |
| Cyan dispersion 1 | 12.5 | 12.5 | 12.5 | 12.5 | 12.5 | 12.5 | 12.5 | 12.5 |
| Total | 100 | 100 | 100 | 100 | 100 | 100 | 100 | 102 |

[1]Components in example 9H are listed as parts and not wt %

Example 10

Viscosity and water resistant properties of the ink compositions of Table 12 are provided in Table 13.

TABLE 13

Ink Viscosity and Water Resistance of Cured Ink Film.

| Viscosity at 25° C. | 9A | 9B | 9C | 9D | 9E | 9F | Comp. 9G |
|---|---|---|---|---|---|---|---|
| Initial | 22.07 | 12.39 | 38.32 | 26.16 | 22.24 | 21.87 | 25 |
| Water resistance, 20 C, 72 hours | | | | | | | |
| Air side | pass | fail | fail | fail | pass | pass | fail |
| Paper towel wipe, soft/peels off | No | Yes | Yes | Yes | No | No | Yes |
| Crosshatch adhesion | 5B | 0B | 0B | 0B | 5B | 5B | 5B |
| Pencil hardness | 2H | 9B scratched | 9B scratched | 9B scratched | 6H | 2H | HB |
| Tin side | pass | fail | fail | fail | pass | pass | fail |

TABLE 13-continued

Ink Viscosity and Water Resistance of Cured Ink Film.

| Viscosity at 25° C. | 9A | 9B | 9C | 9D | 9E | 9F | Comp. 9G |
|---|---|---|---|---|---|---|---|
| Paper towel wipe, soft/peels off | No | Yes | Yes | Yes | No | No | Yes |
| Crosshatch adhesion | 5B | 0B | 0B | 0B | 5B | 0B | 2B |
| Pencil hardness | HB | 9B scratched | 9B scratched | 9B scratched | 2H | 3H | B |

The ink viscosities were in the jettable range, and adhesion on air side of the glass was excellent for 9E, 9A, 9G and for samples 9E and 9G for both air and tin side. The pencil hardness on air side after water immersion decreases as 9E>9A>9G. The addition of a silane adhesion promoter (9A) provides better water resistance than the ink without it (9G). In fact the cured film from comparative example 9G peels off when wiped with paper towel whereas films 9A, 9E and 9F do not peel off. The hexa-functional Ebecryl 1360 in addition to the silane as in composition 9E seems to have provided higher hydrophobicity, compared to composition 9A, leading to better hardness retention.

Example 11

Ink compositions of the invention, containing a silane adhesion promoter, are provided in Table 14.

TABLE 14

Hydrophobic Ebecryl 1360 silane based CMYK inks.

| Raw Material | 11A | 11B | 11C | 11D |
|---|---|---|---|---|
| Irgastab UV10 | 0.02 | 0.02 | 0.02 | 0.02 |
| MeHq | 0.02 | 0.02 | 0.02 | 0.02 |
| I-1035 | 0.4 | 0.4 | 0.4 | 0.4 |
| A186 | 2 | 2 | 2 | 2 |
| Ebecryl 1360 | 1 | 1 | 1 | 1 |
| Genocure MBF | 4 | 4 | 4 | 4 |
| Heloxy 68 | 42.06 | 40.06 | 42.06 | 43.06 |
| Propylene carbonate | 10 | 12 | 10 | 10 |
| ACE | 10 | 10 | 10 | 10.25 |
| Omnicat BL-550 | 18 | 18 | 18 | 18 |
| Cyan Dispersion 1 | 12.5 | | | |
| Magenta Dispersion 1 | | 12.5 | | |
| Yellow Dispersion 1 | | | 12.5 | |
| Black dispersion 1 | | | | 11.25 |
| Total | 100 | 100 | 100 | 100 |

Example 12

Properties of the ink compositions of Table 14 are provided in Tables 15 thru 17. CMYK inkset were prepared (Table 14) with the silane adhesion promoter and hydrophobic Eb1360. The percentage of components were varied slightly to account for viscosity changes. Water resistance tests indicated good hardness (Table 15). The cyan ink composition 11A, for air side, was lower than the other inks. Silanes are known to react with water to form covalent bonds with glass. However, in a cured coating, they tend to react much slowly. The covalent bond formation is expected to help increase humidity resistance of the cured film. This was further confirmed by testing the water resistance of the cyan ink at various periods of time (Table 16). Cured films were left in ambient air/humidity for 1,3,4 and 7 day and placed in deionized water for 72 hours and tested for their adhesion and hardness. The 24 hour sample has pencil hardness of HB, which increases for the 4 day and 7 day sample to 2H and 3H respectively after the water soak test.

TABLE 15

Results of water resistance test for the CMYK inks.

| Air side | 11A | 11B | 11C | 11D |
|---|---|---|---|---|
| Paper towel wipe (soft/peels off) | No | No | No | No |
| Xhatch adhesion | 5B | 5B | 5B | 5B |
| Pencil hardness | HB | 3H | 4H | 6H |
| Tin side | 11A | 11B | 11C | 11D |
| Paper towel wipe (soft/peels off) | No | No | No | No |
| Xhatch adhesion | 5B | 5B | 5B | 5B |
| Pencil hardness | HB | 3H | 6H | F |

TABLE 16

Water resistance retention with time for the cyan ink Example 11A.

| Water resistance, 20 C., 72 hours | Air Side paper towel wipe | Air Side pencil hardness | Air Side Cross hatch | Tin side paper towel wipe | Tin side pencil hardness | Tin side Cross hatch |
|---|---|---|---|---|---|---|
| 24 hour | No | HB | 5B | No | HB | 5B |
| 3 day | No | HB | 5B | No | 2H | 5B |
| 4 day | No | 2H | 5B | No | 2H | 5B |
| 7 day | No | 3H | 5B | No | 2H | 5B |

TABLE 17

Comparison of pencil hardness of films with and without silane and hydrophobic component.

| | Air | Tin |
|---|---|---|
| Pencil hardness before water soak | | |
| Example 11A | 6H | 4H |
| Comp. Example 9G | 6H | 4H |
| Pencil hardness after water soak | | |
| Example 11A | 2H | 2H |
| Comp. Example 9G | HB | B |

Inks with and without silane and the hydrophobic component have comparable pencil hardness before the water soak (Table 17). However, the inks with silane and hydrophobic component retained their hardness to greater degree, when compared to ink compositions without these components.

Example 13

Magenta ink compositions 13B thru 13D of the inkjettable ink of the invention, containing a silane adhesion promoter, and comparative composition 13A, without the silane adhesive promoter, and are provided in Table 18.

TABLE 18

Formulations of Magenta Ink with and Without Silane Adhesion Promoter

| Raw material | Comp. 13A | 13B[1] | 13C[1] | 13D[1] |
|---|---|---|---|---|
| Comp. 13 A Composition | | 20 | 20 | 20 |
| Irgastab UV 10 | 0.02 | | | |
| Byk361N | 0.06 | | | |
| Byk 377 | 0.2 | | | |
| MEHQ | 0.02 | | | |
| Irganox 1035 | 0.4 | | | |
| Genocure MBF | 4 | | | |
| Omnicat BL550 | 17.8 | | | |
| Heloxy 68 | 41 | | | |
| Propylene carbonate | 10 | | | |
| ACE | 14 | | | |
| A186 | | 0.4 | | |
| A172 | | | 0.4 | |
| A174 | | | | 0.4 |
| Magenta Dispersion 1 | 12.5 | | | |
| Total | 100.00 | 20.40 | 20.40 | 20.40 |

[1]Components in examples 13B, 13C and 13D are listed as parts and not wt %

Example 14

Water resistant properties of the ink compositions 13A through 13D of Table 18 are provided in Table 19.

TABLE 19

Water resistance of the magenta inks.

| Properties | Method | 13A | 13B | 13C | 13D |
|---|---|---|---|---|---|
| Hot Water resistance | 80° C., 30 mins | 5B | 3B | 3B | 3B |
| Hot steam resistance | above steam, 15 mins | 4B | 5B | 5B | 5B |
| Water resistance | 20° C., 72 hours | 0B | 5B | 4B | 3B |

Example 15

Clear primer compositions containing a silane adhesion promoter are provided in Table 20.

TABLE 20

Formulations of Silane Based Clear Primer Compositions.

| Raw Material | 15A | 15B | 15C | 15D |
|---|---|---|---|---|
| MEHQ | 0.025 | 0.025 | 0.025 | 0.025 |
| ITX | 0.7 | 0.7 | 0.7 | 0.7 |
| Irgacure 250 | 3 | 3 | 3 | 3 |
| Genocure MBF | 4 | 4 | 4 | 4 |
| Heloxy 68 | 76.275 | 76.275 | 76.275 | 76.275 |
| ACE | 16 | 16 | 16 | 16 |
| A186 | 0.4 | | | |
| A189 | | 0.4 | | |
| A172 | | | 0.4 | |
| A174 | | | | 0.4 |
| Total[1] | 100.4 | 100.4 | 100.4 | 100.4 |

[1]Components in Table 20 are listed as parts and not wt %

Example 16

Clear inks 15A through 15D were prepared with different silanes (Table 20). Drawdowns of 15A through 15D were done with 6 Mayer rod on glass, cured with fusion H lamp at 700 mJ/cm$^2$ followed by a post cure for 1 minute at 100° C. The cured clears were top coated with magenta ink 13A using a 6 Mayer rod and cured with fusion H lamp at 700 mJ/cm$^2$ followed by a post cure for 1 minute at 100° C. Water resistance properties of the magenta ink 13 A on top of 15A, 15C and 15D are provided in Table 21. All the drawdowns had excellent crosshatch adhesion after the hot water resistance, steam and room temperature water resistance test.

TABLE 21

Water Resistance Properties of Magenta Ink with Clear Silane Based Primer.

| Properties | 13A on top of 15A | 13A on top of 15C | 13A on top of 15D |
|---|---|---|---|
| Hot Water resistance (80° C., 30 mins) | 5B | 5B | 5B |
| Hot steam resistance (above steam 15 mins) | 5B | 5B | 5B |
| Water resistance (20° C., 72 hours) | 5B | 5B | 5B |

Example 17

A piezo DOD printhead is typically fabricated with metallic components. Composition Example 9H was utilized for jet testing. The results are shown in Table 22. Grayed area indicates no data points collected.

TABLE 22

Jet Operating Window For Cyan Ink With Silane (Example 9H) Aged On A Galaxy Dimatix Printhead.

| | 30° C. | 35° C. | 40° C. | 45° C. | 50° C. |
|---|---|---|---|---|---|
| Initial | | | | | |
| 120 V | 0 | 0 | 0 | 0 | 2 |
| 110 V | 0 | 0 | 0 | 0 | 0 |
| 100 V | 0 | 0 | 0 | 0 | 0 |
| 90 V | Fail | 0 | 0 | 1 | 0 |
| 80 V | Fail | Fail | 0 | 0 | 0 |
| After 7 days | | | | | |
| 120 V | 0 | 3 | 0 | 1 | 1 |
| 100 V | 0 | | | | |
| 90 V | Fail | 0 | | | |
| 80 V | Fail | Fail | 0 | 0 | 2 |
| After 15 days | | | | | |
| 120 V | 0 | 0 | 0 | 2 | 1 |
| 100 V | 0 | | | | |
| 90 V | | 0 | | | |
| 80 V | | | 0 | 0 | 0 |

Table 22: Jet operating window (JOW) of the ink was tested on a Dimatix Galaxy piezo (DOD) printhead at 30 to 50° C. from 80 to 120V. JOW for the cyan ink 9H was 90-100V at 30° C., and 80-100 V at 40-50° C. For the magenta ink 11B it was 80-130 V at 30° C., 80-110 V at 40° C., 80-90V at 50° C. For the yellow ink 11C it was 80-130 V at 30° C., 80-110 V from 40-50° C. For the black ink 11D it was 90-110 V at 30° C., 80-120 V at 40° C., 80-100V at 50° C. Ink 9H was left in the printhead for 2 weeks and jet stability tested weekly to confirm ink stability in the printhead and no adverse reaction with printhead components. The JOW was quite similar even after 2 weeks thereby confirming jet stability.

Table 23: The JOW of 11A was tested on a Spectra SE 128 printhead and initial testing showed a JOW of 80-120 V from 35 to 60° C. 11A ink was left in the printhead and tested after 7 and 15 days to confirm jet stability. The JOW from 35-55° C. remained similar to the initial value. This indicated that the ink was stable in the printhead obviating any concerns due to the presence of the reactive silane.

Example 18

Composition Example 11A was also utilized for jet testing. The results are shown in Table 23. In one embodiment, the inks are stable for greater then 1 day, preferably 5 days, more preferably 1 week and even more preferably greater than 2 weeks.

TABLE 23

Jet Operating Window for Example 11A Using Spectra SE 128 Printhead at 16 kHz.

|     | 35° C. | 40° C. | 45° C. | 50° C. | 55° C. | 60° C. |
|---|---|---|---|---|---|---|
| Initial Jet Operating Window ||||||||
| 140 V | 4 |   |   |   |   |   |
| 130 V | 3 | 7 | 9 |   |   |   |
| 120 V | 2 | 0 | 0 | 1 | 2 | 4 |
| 110 V | 0 | 1 | 0 | 0 | 2 | 3 |
| 100 V | 0 | 0 | 0 | 0 | 0 | 0 |
| 90 V  | 0 | 0 | 0 | 0 | 0 | 0 |
| 80 V  | 3 | 3 | 0 | 1 | 0 | 0 |
| After 1 Week 16 kHz ||||||||
| 140 V |   |   |   |   |   |   |
| 130 V | 4 | 6 | 11 |   |   |   |
| 120 V | 2 | 3 | 1 | 1 | 4 |   |
| 110 V | 0 | 0 | 0 | 0 | 0 | 6 |
| 100 V | 0 | 0 | 0 | 1 | 0 | 1 |
| 90 V  | 1 | 0 | 0 | 0 | 0 | 0 |
| 80 V  | 0 | 0 | 1 | 0 | 0 | 0 |
| After 2 Weeks 16 kHz ||||||||
| 140 V | 11 | 23 |   |   |   |   |
| 130 V | 4  | 8  | 10 |   |   |   |
| 120 V | 0  | 0  | 0 | 0 | 6 |   |
| 110 V | 0  | 0  | 0 |   |   | 3 |
| 100 V | 0  | 1  | 0 |   |   |   |
| 90 V  | 0  | 0  | 0 | 0 |   |   |
| 80 V  | 0  | 0  | 0 | 1 | 0 | 0 |

Numbers indicate the amount of jets lost in the 3 minute test.
More than 5 jets out prior to testing.
No datapoints were collected in Grey areas.

The specific illustrations and embodiments described herein are exemplary only in nature and are not intended to be limiting of the invention defined by the claims. Further embodiments and examples will be apparent to one of ordinary skill in the art in view of this specification and are within the scope of the claimed invention.

We claim:

1. A radiation curable ink composition for impulse printheads, comprising:
    a) a photoinitiator system which comprises both a photocation polymerization initiator and a free-radical photoinitiator, each in the amount of about 1 to about 12 wt. %;
    b) from about 0.5 to about 30 wt. % of an acrylate ester of a carboxylic acid ester represented by the formula:

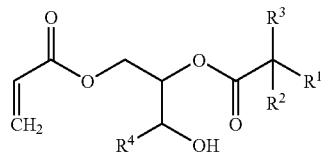

having a carboxylate ester moiety containing groups $R^1$, $R^2$ and $R^3$, which are each independently alkyl, aryl, alkylaryl, alkoxyaryl or cycloaliphatic groups, where the total number of carbon atoms included in groups $R^1$, $R^2$ and $R^3$ range from 1 to 10, and wherein $R^4$ is a group selected from hydrogen, methyl, ethyl, propyl, butyl, pentyl, hexyl, heptyl, octyl, nonyl, decyl, phenyl and alkoxy phenyl; and
    c) from about 3 to about 60 wt. % of at least one radiation curable material containing a radiation curable functional group;

wherein the ink composition has a viscosity of less than about 70 cPs at 25° C.

2. The radiation curable ink composition of claim 1 wherein the carboxylate ester moiety is derived from alpha, alpha-dimethyl-Caproic acid, alpha-ethyl-alpha-methyl-Caproic acid, alpha,alpha-diethyl-Caproic acid, alpha,alpha-diethyl-Valeric acid, alpha,alpha-dimethyl-Capric acid, alpha-butyl-alpha-ethyl-Capric acid, alpha,alpha-dimethyl-Enanthic acid, alpha, alpha-diethyl-Pelargonic acid, alpha-butyl-alpha-methyl-Caproic acid, alpha,alpha-dimethyl-Caprylic acid, alpha-methyl-alpha-propyl-Caproic acid, alpha-ethyl-alpha-methyl-Enanthic acid, alpha-methyl-alpha-propyl-Valeric acid, alpha-ethyl-alpha-methyl-Caprylic acid, alpha-butyl-alpha-methyl-Caprylic acid, alpha-ethyl-alpha-propyl-Caproic acid, alpha-ethyl-alpha-propyl-Valeric acid, alpha-butyl-alpha-ethyl-Pelargonic acid, alpha,alpha-dimethyl Propionic acid (pivalic acid), neodecanoic acid and combinations thereof.

3. The radiation curable ink composition of claim 1 wherein the radiation curable material comprises a monofunctional monomer, a poly-functional monomer and a di-functional monomer.

4. The radiation curable ink composition of claim 1 wherein the radiation curable material comprises a monofunctional monomer and a poly-functional monomer, and is substantially free of di-functional monomer.

5. The radiation curable ink composition of claim 1 wherein the radiation curable material comprises a monofunctional monomer and a di-functional monomer, and is substantially free of a poly-functional monomer.

6. The radiation curable ink composition of claim 1 wherein the radiation curable material comprises a monofunctional oxetane.

7. The radiation curable ink composition of claim 1 wherein the photocation polymerization initiator and the free-radical photoinitiator are each independently utilized in an amount of about 0.5 to about 15 wt. %, based on the total weight of the ink.

8. The radiation curable ink composition of claim 1 wherein the acrylate ester of carboxylate acid ester is utilized in an amount of about 0.5 to about 30 wt. %, based on the total weight of the ink.

9. The radiation curable ink composition of claim 1 wherein the at least one radiation curable material comprises a mono-functional component in an amount of about 1 to about 70 wt. %, a poly-functional component in an amount of about 0 to about 95 wt. %, and a di-functional component in an amount of about 0 to about 95 wt. %, based on the total weight of the ink.

10. The radiation curable ink composition of claim 1 wherein the at least one radiation curable material comprises a mono-functional component in an amount of about 3 to about 60 wt. %, a poly-functional component in an amount of about 5 to about 80 wt. %, and a di-functional component in an amount of about 5 to about 80 wt. %, based on the total weight of the ink.

11. The radiation curable ink composition of claim 1 further comprising a silane adhesion promoter.

12. The radiation curable ink composition of claim 1 wherein the composition has a jet operating window at a jetting frequency of at least about 1 Hz to about 32 kHz, and wherein the composition exhibits stable jetting after residing in the printhead for a period of at least 1 day.

13. The radiation curable ink composition of claim 1 wherein the composition has a jet operating window at a jetting frequency of at least about 1 Hz to about 16 kHz, and wherein the composition exhibits stable jetting, after residing in the printhead for a period of at least 1 day.

14. The radiation curable ink composition of claim 11 wherein the composition has a jet operating window at a jetting frequency of at least about 1 Hz to about 32 kHz, and wherein the composition exhibits stable jetting, after residing in the printhead for a period of at least 1 day.

15. A radiation curable ink composition for impulse printheads, comprising:
   a) a photoinitiator system which comprises both, based on the total weight of the ink, from about 2 to about 10 wt. % of a photocation polymerization initiator and, based on the total weight of the ink, from about 1 to about 12 wt. % of a free-radical photoinitiator;
   b) from about 1 to about 25 wt. % of an acrylate ester of a carboxylic acid ester represented by the formula:

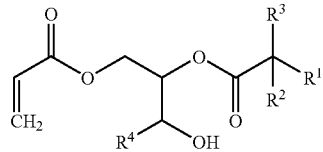

having a carboxylate ester moiety containing groups $R^1$, $R^2$ and $R^3$, which are each independently alkyl, aryl, alkylaryl, alkoxyaryl or cycloaliphatic groups, where the total number of carbon atoms included in groups $R^1$, $R^2$ and $R^3$ range from 1 to 10, and wherein $R^4$ is a group selected from hydrogen, methyl, ethyl, propyl, butyl, pentyl, hexyl, heptyl, octyl, nonyl, decyl, phenyl and alkoxy phenyl; and
   c) from about 5 to about 50 wt. % of at least one radiation curable material containing a radiation curable functional group selected from the group consisting of an acrylate ester monomer having hydroxyl functionality, a mono-functional oxetane, a mono-functional epoxy, a mono-functional vinyl ether or vinyl ether alcohol, a mono-functional ethylenically unsaturated compound, a mono-functional oligomer, and a mixture thereof;
wherein the ink composition has a viscosity of less than about 70 cPs at 25° C.

16. The radiation curable ink composition of claim 15, wherein the radiation curable functional group comprises a mono-functional oxetane and a di-functional oxetane.

17. The radiation curable ink composition of claim 15, having an elongation of at least 40%.

18. The radiation curable ink composition of claim 1 wherein the acrylate ester monomer of the carboxylic acid ester is utilized in an amount of about 1 to about 25 wt. %.

19. The radiation curable ink composition of claim 1 wherein the ink composition has a viscosity of about 5 to about 70 cPs at 25° C.

20. The radiation curable ink composition of claim 15 wherein the ink composition has a viscosity of about 5 to about 70 cPs at 25° C.

* * * * *